April 9, 1968

H. S. DAVIS 3,377,446

TIMING MECHANISM

Filed May 23, 1966

INVENTOR
HARRY S. DAVIS
BY *Harry N. Schofer*

ATTORNEY

United States Patent Office 3,377,446
Patented Apr. 9, 1968

3,377,446
TIMING MECHANISM
Harry Shafter Davis, 600 NE. 13th St.,
Fort Lauderdale, Fla. 33304
Filed May 23, 1966, Ser. No. 552,094
7 Claims. (Cl. 200—38)

This invention relates to timing mechanisms in general, and more specifically to improvements in timing mechanisms and the like which make them more useful for their intended purpose and safer to operate.

While being useful in a great number of different fields wherein a time controlled operation is desired, this invention finds particular application in the field of time-controlled irrigation systems and the like, and will be described with particular reference in such application.

In irrigation systems having a large number of outlets or spray heads, the usual practice is to divide the system into two or more branch lines, each branch line having a certain number of outlets depending upon the available supply of water, which may be delivered from a well, river, or city supply source. Water is supplied to each branch line periodically for a required length of time, which requires a distribution system having a main supply line and two or more valve controlled branches. It is customary to provide a timing mechanism to periodically open and close the valves in the branch lines. These timing mechanisms have adjustable means whereby adjustments can be made to operate the valves in the various branch lines at selected intervals and for predetermined periods of time.

These timing mechanisms, as a rule, are complex, and costly to manufacture.

It is an object of this invention to provide a novel timing mechanism that is simple in construction and which can be manufactured cheaply.

It is a further object to provide a novel timing mechanism that is readily adaptable to operate one or more switch elements simultaneously or consecutively.

It is a still further object to provide a novel timing mechanism having a number of variably positioned keys which can be simply, safely and readily changed, and which, when positioned, are locked in position and cannot fall out.

It is a still further object to provide a novel timing mechanism which is reliable in operation, and compact in construction.

The attainment of the above and other objects and advantages will be better understood from the following detailed description and from the annexed drawings, in which.

Figure 1:
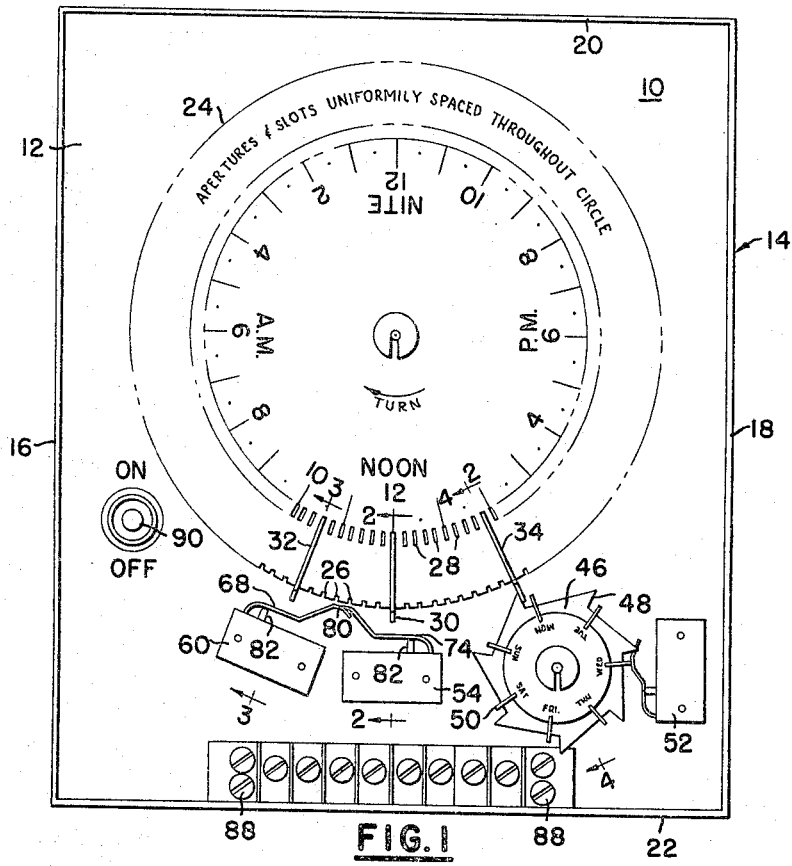
FIG. 1 is a front face view of a timing mechanism embodying the principles of the invention.

Referring to the drawings, wherein corresponding elements are designated by the same reference numerals, and particularly to FIG. 1, there is illustrated a timing mechanism, designated in its entirety by the numeral 10, carried on a mounting plate 12 disposed within a housing 14 having side walls 16 and 18, a top wall 20, and a bottom wall 22. The walls surround the mechanism with slight clearance to provide a compact structure, and a door, not shown, closes the front of the housing. The mounting plate 12 is secured to the back wall 15 of the housing by conventional means in the usual manner.

The timing mechanism 10 includes a timing dial 24 which is rotatable in a clockwise direction by a synchronous electric motor and reduction gearing in a well known manner forming no part of this invention. The usual slip connection between the motor and the timing dial 24 permits relative movement so that the dial can be set for the exact time, all as known in the art.

The timing dial is connected with its motor so that the dial makes one complete rotation every 24 hours, and carries radial markings, arranged 15° apart peripherally, designating the hours of the day, from 1 to 12 a.m. and from 1 to 12 p.m. Between the hourly radial markings there are dots indicating the half hour, and if desired, other markings indicating quarter hours may be added in an obvious manner.

At 3° intervals throughout the periphery of the dial 24, there are disposed 120 axially extending slots 26 reaching from the front face to the back face of the dial. One slot 26 is radially aligned with each hourly radial marking, and there are four slots between each hourly radial marking, so that it takes 12 minutes for one slot to move from the distance it occupied to the distance previously occupied by an adjacent slot.

Disposed radially inward of the periphery, and coaxially of the center of rotation, there is a ring of axially extending apertures 28, each aperture extending more than half way through the thickness of the dial 24. The apertures 28 are equal in number to the axially extending slots 26 and are arranged in radial alignment therewith, so that a slot 26 and an aperture 28 lie, in pairs, along 120 radial lines.

Figure 2:
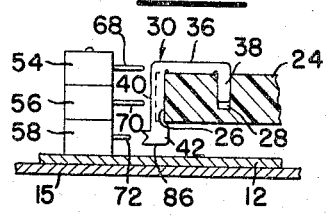
FIG. 2 is a sectional view along the line 2—2 of FIG. 1 showing a key, and a group of microswitches in juxtaposition therewith.
Figure 3:
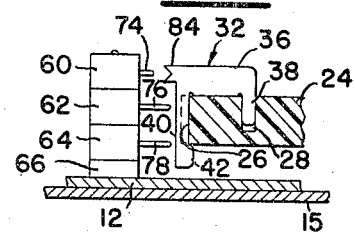
FIG. 3 is a sectional view along the line 3—3 of FIG. 1 showing a second key, and a second group of microswitches in juxtaposition therewith.
Figure 4:
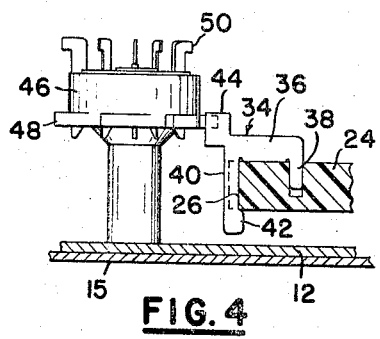
FIG. 4 is a sectional view along the line 4—4 of FIG. 1 showing a third key and a calendar dial operated thereby.

Each pair of slots 26 and apertures 28 forms a receiving and anchoring means for a U-shaped key, three of which are illustrated and designated by the numerals 30, 32 and 34. Each of these keys is made from a suitable resilient material, metal or plastic, and comprises a bright portion 36, a shorter leg 38 and a longer leg 40. The shorter leg 38 has a length less than the thickness of the dial, so that it can be disposed within an aperture 28, as shown in FIGS. 2, 3 and 4. The longer leg 40 has a length greater than the thickness of the dial 24, so that, when in position, a portion of the leg extends beyond the back fece of the dial. That portion of the leg which extends beyond the back face of the dial 24 carries an inwardly extending portion 42 adapted to engage the rear face of the dial, as shown, to form a locking means. The spacing of the legs 38 and 40 is substantially the same as the spacing of the apertures 28 and slots 26 to provide a friction fit, and the inherent resilience of the keys 30, 32 and 34 enables the legs to spread apart slightly to accommodate the inwardly projecting portions 42 when the keys are inserted or withdrawn by axial movement.

Referring to FIG. 4, the bight portion 36 of the U-shaped key 34 includes an ear 44 which extends axially and radially outwards in proximity with a calendar dial 46 mounted for rotation on the mounting plate 12. The calendar dial 46 is provided with seven radially extending, uniformly spaced, lobes 48 having a radially extending face in the path of rotation of the ear 44 on the U-shaped key 34. Each lobe 48 is designated by a different day of the week, so that each time the timing dial 24 completes one rotation, a lobe 48 on the calendar dial is contacted by the ear 44 and the calendar dial 46 is rotated one-seventh of a complete rotation thereby moving an adjacent lobe 48 into the path of movement of the ear 44 to be contacted and moved by the ear when the timing dial 24 completes another rotation. Adjacent each lobe 48 on the calendar dial 46 there is provided an axially slidable key 50 having a radially projecting ear on each end. The ear on the inner end of the key 50 is adapted to engage and operate the operating lever of a microswitch 52 mounted adjacent thereto. The microswitch 52 is a normally open switch disposed in the circuit of a timing system for an irrigation system, known in the art as a skip-watering switch. If it is desired to skip watering any day or days of the week, the slidable key 50 for that particular day or days can be retracted by manually engaging the outer ear which withdraws the inner ear so it does not contact the operating member of the microswitch 52. On the other hand, if it is desired to have watering on any particular day or days of the week, the particular key or keys 50 for such day or days are manually depressed which moves the inner ear into position to contact the operating member and close the microswitch 52 in a well known manner. The calendar dial and its operation are well known in the art, and form no part of this invention.

A plurality of microswitches 54, 56, 58, 60, 62 and 64 are disposed in juxtaposition with the timing dial 24 to be selectively operated by one or more of the U-shaped keys mounted on the dial. As shown in FIGS. 1, 2 and 3, these microswitches are disposed in two banks arranged in arcuately spaced relation. The switches 54, 56 and 58 are mounted in a first bank in side-by-side relation on the mounting plate 12, with their operating levers 68, 70 and 72 extending in the same direction adjacent the periphery of the timing dial 24. The operating levers 68, 70 and 72 are arranged in space side-by-side relation, each lever lying in a plane parallel with the plane of the timing dial 24. The switches 60, 62 and 64 are mounted in side-by-side relation to form a second bank secured to the mounting plate 12. A spacer 66, about one-half the thickness of a microswitch unit, is interposed between the mounting slate 12 and the bank of microswitches 60, 62 and 64 for a purpose to be explained later. The microswitches 60, 62 and 64 have operating levers 74, 76 and 78, respectively, and the microswitches are mounted so that the operating levers are adjacent the periphery of the timing dial 24 and extend in a direction opposite that of the operating levers 68, 70 and 72 of the microswitches 54, 56 and 58, respectively. Because of the spacer 66, the operating levers 74, 76 and 78 will lie in different planes than the operating levers 68, 70 and 72. Each operating lever 68, 70, 72, 74, 76 and 78 has an arcuate portion 80 intermediate its ends and disposed in the path of movement of one or more of the keys mounted on the timing dial 24. The microswitches 54, 56, 58, 60, 62 and 64 are mounted so that their arcuate portions are disposed in side-by-side and spaced relation with the arcuate portions 80 of the operating levers of the microswitches in one bank being interdigitated with the arcuate portions 80 of the operating levers of the microswitches in the second bank, and with the arcuate portions 80 being disposed in substantially the same arcuate zone of the timing dial 24. The arcuate portion 80 extends about 4° of the rotation of the timing dial 24 so that a key 30 or 32 on the timing dial operates a microswitch to opened or closed position, depending upon whether the microswitch is a normally closed or normally opened type, for a period of about 15 minutes. Since the keys can be placed in successive slots 26 and apertures 28 which are spaced 12 minutes time apart, it is possible to retain any microswitch in operative position (either opened or closed) as long as desired in multiples of approximately 12 minutes by utilizing a number of keys in consecutive slots and apertures. Thus, if one hour of operation of a particular microswitch is desired, five keys can be used, placed in consecutive slots 26 and apertures 28.

Referring to FIG. 2, the leg 40 of the U-shaped key 30 has an ear 86 near the outer end, in a position to operate the operating lever 72 of the microswitch 58. FIG. 3 shows an ear 84 on the bight portion 36 of the U-shaped key 32 to actuate the operating lever 74 of the microswitch 60. It is evident that the ears can be disposed at any desired point along the longer leg 38, or on the bight portion, to actuate any microswitch in either bank, and that two or more ears can be arranged on a single leg 40. Any number of keys may be used, with one or more ears on each, disposed in position to actuate any desired microswitch.

A plurality of terminal posts 88 are provided in the lower part of the mounting plate 12 for connecting leads from a source of electrical current and to a number of elements to be operated by the timing mechanism. Any number of terminal posts may be provided, depending upon the number of switch elements used.

There is also provided a two position toggle switch 90, connected with the motor of the timing mechanism, capable of being moved to an "ON" position and to an "OFF" position, in a well known manner.

Each ear 84 and 86 has a V-shaped notch to retain the operating lever of the microswitch in contact with the ear.

Although the example illustrated shows six microswitches, arranged in two banks, it is evident that more than three, or less than three, microswitches can be arranged in each bank.

By utilizing thinner microswitches, or by arranging the timing dial farther from the mounting plate 12 and making the legs 40 of the keys longer, it is possible to use and operate more than three microswitches in each bank.

The above-described construction and the axial movement of the keys for insertion and withdrawal form an important feature of the invention. It should be noted that the side walls 16 and 18, and the top wall 20 of the housing 14, are disposed closely adjacent the periphery of the dial 24 to provide a compact structure. In a similar timing device on the market, U-shaped keys are held in place by radially extending slots on the front and rear faces of the dial, which requires a radial movement of the keys for insertion and withdrawal. Because of the close proximity of the side walls 16 and 18 to the dial at the 90° and 270° positions, and the proximity of the top wall 20 in the 0° position of the dial 24, it is apparent that, in the case of the radially movable keys of the devices described above, the keys could not be removed or inserted at or near the 0°, 90° and 270° positions of the dial, but the dial would have to be rotated 45° clockwise from such positions where there is sufficient space to permit the removal or insertion operation. In the arrangement of this invention, the keys may be quickly and readily inserted or withdrawn, by a simple axial movement, from any position of the timing dial 24. In the case of a timing device where the keys are inserted or removed by radial movement, there is the likelihood, if the keys are accidentally dropped during such movement, that they will fall into the electrical connections disposed below the dial 24. If the keys are made of metal having electrical conductive properties, there is the danger of short-circuiting and burning out various parts. Furthermore, there is the added danger in probing and recovering the fallen key. In the improvement forming the subject matter of this invention, the key, if accidentally dropped, will fall clear of the dial and harmlessly in front of the electrical connections, whence it can be easily and safely recovered.

Having fully described my invention, it is to be understood that I do not wish to be limited to the particular details set forth herein but that various changes may be made in the details and proportions without departing from the principles of the invention or from the scope of the annexed claims.

I claim:

1. In a timing mechanism, in combination: a rotating timing dial having an axis of rotation, a series of axially extending slots spaced around the periphery of said dial, and a series of axially extending apertures spaced in a circle concentrically of said axis of rotation and disposed inwardly from the periphery of said dial, said apertures being equal in number with said slots and disposed along corresponding radial lines; a plurality of U-shaped keys removably inserted in said slots and apertures, said keys made of resilient material and the spacing of the legs of the U corresponding to the radial spacing of a companion aperture and slot, each of said keys having at least one projecting ear; and at least one operated member having a movable projection disposed in the path of movement of an ear and operated thereby.

2. In a timing mechanism as defined in claim 1, in which an ear is disposed in the bight of the U-shaped key.

3. In a timing mechanism as defined in claim 1, in which each ear includes a V-shaped notch.

4. In a timing mechanism as defined in claim 1, in which one leg of the U-shaped key is shorter than the thickness of the timing dial and the other leg is longer than the thickness of the timing dial, said longer leg having an inwardly extending portion adapted to resiliently engage the rear surface of said timing dial to lock the key in place.

5. In a timing mechanism as defined in claim 1, in which the ear is disposed in the outer leg of the U-shaped key lying in the peripheral slot and extends radially outwardly, the ears in different keys being located at different points along said leg.

6. In a timing mechanism as defined in claim 5, in which the operated members comprise a plurality of switches disposed in side-by-side relationship, said movable projections disposed in spaced relation and each projection lying in the path of movement of at least one of said ears to be actuated thereby.

7. In a timing mechanism as defined in claim 5, in which said operated members comprise a plurality of switches, said switches being mounted in two groups, each group comprising at least two switches arranged in side-by-side relationship with their movable projections disposed in spaced relation, the projections of one group extending in the direction of rotation of said timing dial and the projections of the other group extending in an opposite direction, each projection having an arcuate portion disposed in the path of movement of an ear, said groups being mounted at spaced circumferential positions whereby the projections of one group interdigitate with the projections of the other group and whereby the arcuate portions are disposed in spaced side-by-side relation to be actuated by said keys when said keys, in the course of the rotation of said timing dial, reach substantially the some point in the rotation.

References Cited
UNITED STATES PATENTS

| 1,882,495 | 10/1967 | Hipp | 200—38 |
| 3,305,649 | 1/1967 | Hauser | 200—38 |

BERNARD A. GILHEANY, *Primary Examiner.*

F. E. BELL, *Assistant Examiner.*